United States Patent [19]
Worden

[11] 3,944,775
[45] Mar. 16, 1976

[54] WELDING PROCESS

[75] Inventor: Donald P. Worden, Union Grove, Wis.

[73] Assignee: Tenneco Inc., Racine, Wis.

[22] Filed: Dec. 11, 1972

[21] Appl. No.: 313,664

[52] U.S. Cl................................... 219/67; 219/59
[51] Int. Cl.².................................... B23K 31/06
[58] Field of Search .................. 219/59, 67, 61, 62; 29/497.5; 228/17, 44

[56] References Cited
UNITED STATES PATENTS

| | | | |
|---|---|---|---|
| 611,222 | 9/1898 | Ries | 29/497.5 |
| 2,774,857 | 12/1956 | Rudd et al. | 219/67 |
| 3,414,697 | 12/1968 | Rudd | 219/67 X |
| 3,648,008 | 3/1972 | Kawato et al. | 219/67 |

*Primary Examiner*—C. L. Albritton
*Attorney, Agent, or Firm*—Harness, Dickey & Pierce

[57] ABSTRACT

An internal spreader bar provides control of the convergence point and convergence angle of opposite electrically heated edges of a skelp during a tube seam welding operation and other controls are practiced to increase weld pressure at the faying surfaces.

33 Claims, 5 Drawing Figures

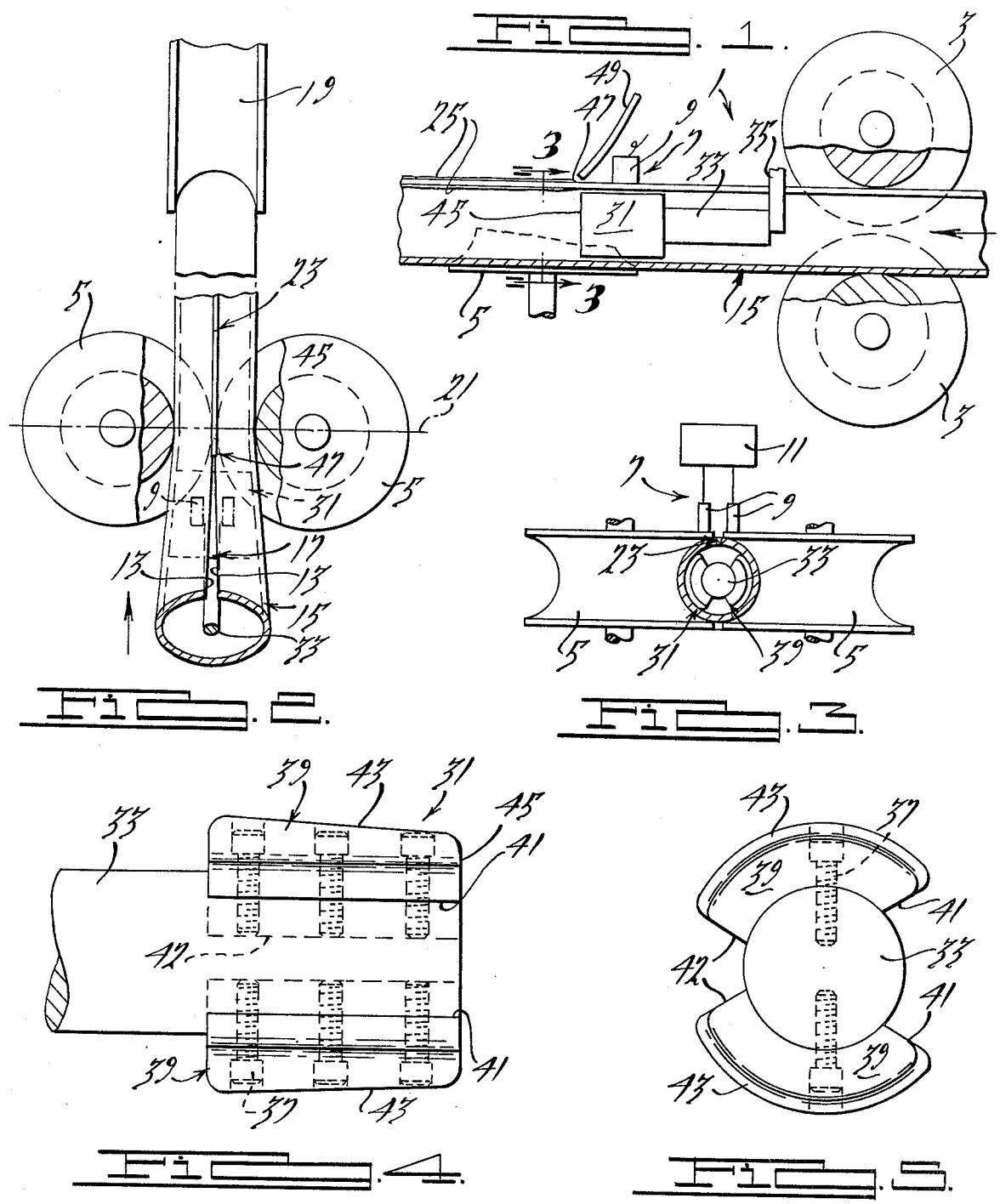

WELDING PROCESS

BRIEF SUMMARY OF THE INVENTION

It is the purpose of this invention to provide a method and means for improving the uniformity and quality of the welded seam in the manufacture of seam welded tubing, especially alloy tubing such as stainless steel.

The invention accomplishes this purpose by carefully controlling the separation of opposite seam edges and the length of the interfacial pressure contact between them ahead of the weld line, thereby effectively controlling the area of contact and raising the interfacial contact pressure as compared with conventional processes. The control is preferably achieved in part by means of a spreader device that is inserted inside of the tubing. It is also preferred that the volume of metal heated to welding temperature be controlled to minimize the amount of upset metal and thereby create maximum weld pressures.

DESCRIPTION OF THE DRAWINGS

FIG. 1 is a schematic side elevation of a tube mill including welding apparatus embodying the invention;

FIG. 2 is a plan view taken from the top of FIG. 1;

FIG. 3 is a section along the line 3—3 of FIG. 1;

FIG. 4 is an enlarged plan view of the spreader; and

FIG. 5 is an end view of the structure shown in FIG. 4.

DESCRIPTION OF THE INVENTION

Referring to FIGS. 1 — 3, a tube making mill 1 includes two sets of rolls 3 and 5 which are positioned, respectively, on the upstream and downstream sides of a suitable metal heater, preferably a high frequency electrical current welder 7. The welder 7 is shown for illustrative purposes as an electrode or contact type (available on the open market for tube making applications), though other welders may be used, and includes contacts 9 connected to a high frequency generator or power souce 11. The weld current frequency is preferably in the range of 200 to 500 kilocycles per second. The tube mill 1 is not shown completely and would include upstream of rolls 3 a plurality of sets of forming rolls which progressively form strip metal into a skelp or tube-like form. These include closing rolls (not shown) to align the spaced, unwelded edges 13 of the skelp or unwelded portion of tube 15 and partially bring them together. They cooperate with the weld pressure rolls 5 or pressure applying means which bring the edges into high pressure face to face contact or abutment for welding, the edges being on opposite sides of a V-shaped gap 17 as the skelp approaches rolls 5. A set of rolls 19, downstream from pressure rolls 5, acts along with other roll sets including set 3, to continuously move the tube through the tube mill 1 at a desired rate of speed. It will be understood that other welding techniques and apparatus may be used, such as an induction coil.

In operation, the tube 15 moves from right to left and as it goes through the rolls the V-gap 17 is formed and then the opposite edges 13 are squeezed together by rolls 5, the maximum weld pressure line being defined substantially by the roll center line 21. High frequency current is applied to the edges 13 by contacts 9 which are placed respectively on opposite sides of the gap 17 upstream of the maximum pressure line 21. This current heats the edges 13 to a desired degree and depth so that when pressure is applied by rolls 5 to bring them into contact they are joined together in a butt weld or seam 23 that, due to upsetting of the soft, heated metal, includes some flash 25 on the inner and outer walls of the tube. This is removed by a suitable flash removal tool (not shown) at a suitable point downstream from the weld line 21 whereupon the tubing should be ready for cutting to length and use.

It has been found that an unrefined welding technique such as just described does not consistently produce high quality tubing. This particularly true when the metal is an alloy steel, such as A.I.S.I. 409 stainless steel. Past processes have often required an annealing operation after welding and/or very close control of metal composition to a narrower range than is available commercially at competitive prices. In normal processing, as with equipment so far described, the initial upsetting or flash will usually start at a distance of 5 to 8 times the tube wall thickness ahead of line 21. This distance of early upsetting results from the circumferential reduction of the tube 15 required in rolls 5 to create the needed weld pressure. While the flanges on rolls 5 provide some support or containment, there must be a gap between them for passage of flash and the rolls therefore, of themselves, do not resist excessive upsetting of the weld metal, though I believe it is desirable to hold the roll flange gap to no more than 0.015 to 0.025 inch more than the metal thickness. I have found that very significant improvements in terms of weld quality and uniformity, particularly with alloy steel, are obtained by controlling the convergence point of the heated edges 13 with respect to pressure line 21 so that upsetting or flash begins at a substantially shorter distance ahead of maximum pressure line 21, preferably only 1 to 3 times the wall thickness. Actually, I believe it is best if the beginning point of the upset 25 is only 1 or 2 wall thicknesses ahead of line 21 but at the present time this close control does not seem to be practical from the standpoint of production manufacturing. Control of the length of upset includes control of the length of pressure contact between opposite edges ahead of line 21 and thus control of effective unit area weld pressure. The very high interfacial unit pressure on the faying surfaces that are obtainable by means of this invention cause a break through or penetration of microscopic barrier layers of oxides of base metal composition and enable substantially void free welds to be produced in alloy and stainless sheet metals.

In addition to controlling the convergence point for the edges 13, the invention also preferably provides a means to control the angle of convergence of the edges. In accordance with the invention, this angle is preferably larger than normally employed in the art and preferably exceeds 4°, 5° being suitable. I have noticed that the portions of the edges 13 which are heated curve inwardly so that opposite sides move toward each other. Increase of the convergence angle keeps these bulged edges apart to prevent arcing, metal expulsion, and premature pressure or electrical contact upstream of the desired convergence point. It also reduces the proximity effect of the high frequency current thereby reducing any adverse heating effect of the current flow in the edges. The heating current is applied over a minimum length, preferably so that the length of the edges heated to welding temperature is about 1.00 to 1.25 inch ahead of line 21. These features permit the use in the invention of a decreased time and depth of heating, increased energy input, and an extremely high temperature gradient between the heated plastic edge surfaces and the cooler, stronger core or back-up metal (as compared with normal practice). Thus, the depth of the weld zone is only several mils and much less than in normal practice, the volume of upset metal is less, and the generation of very high interfacial pressures further facilitated. Control of the convergence point and angle in addition to promoting concentration of the heat and reduced depth of heating promotes greater uniformity of heating since it reduces to a minimum the distance between initial edge contact to the beginning of upsetting thereby maintaining effective edge separation to a substantially predetermined point which minimizes variations in energy input per unit volume of metal to give higher consistency and quality of welds.

Since it is an aim of the invention to produce extremely high interfacial pressures by adopting measures to keep the amount of upset to a minimum, it also follows that the metal being welded should, where there is a choice, be selected to have as high a compressive yield strength as practicable. Thus, among the steels, those which are in the austenitic phase during the weld cycle are preferable to those that are ferritic. The high interfacial pressures employed in accordance with the invention tend to minimize the uncontrolled, adverse effects of slight variations in metal chemistry on interface pressure and weld quality and, as indicated, break through any microscopic oxide layers, spots, or inclusions which might at lower pressures produce voids or other imperfections in the weld.

In order to control the convergence point and angle of edges 13 and the length of upset 25, a spreader device 31 is supported inside the unwelded portion of tube 15. The effective outer diameter of the device 31 for a 2 inch O.D. 0.040 to 0.060 inch wall thickness tube is preferably 0.020 inch to 0.050 inch larger than the inner diameter of the unwelded part of the tubing. Its size and location prevent the edges 13 from starting to upset until the desired distance (preferably 1 to 3 wall/thicknesses) ahead of the center line 21. The tube contacting part of the device is tapered to give the required angle of convergence (preferably at least 4°) for the V-gap 17 to provide for initial edge engagement at the desired point. Use of the device 31 enables high welding pressure to be applied by rolls 5 over a precisely controlled interface length and has permitted A.I.S.I. 409 and other steels previously rejected as unweldable to be satisfactorily welded. The magnitude of weld pressure used in practicing my invention is much higher than ordinarily used in high frequency tube welding. For example, in the welding of A.I.S.I. 409 tubing of 2 inch outer diameter and 0.040 to 0.060 inch wall thickness, the pressure is sufficient to produce a circumferential reduction of approximately 0.045 to 0.085 inch in circumference while maintaining a relatively small flash. Proportional reductions for smaller or larger tubes would, I believe, indicate the order of pressure required.

As seen best in FIGS. 4 and 5, the spreader device 31 may comprise a round support bar 33 that is positioned in a substantially coaxial position within tube 15, being supported in this position by a lateral arm 35 (FIG. 1) that projects through the V-gap 17 to be suitably mounted in an adjustably fixed position on a part of the tube mill 1. Secured to opposite sides of the bar 33 by countersunk screws 37 are arcuate, tapered pads 39 of suitable long wearing, non-magnetic material such as industrial nylon, hardened bronze, diamonite, etc. The top longitudinal edges 41 of the two pads may be angularly spaced somewhat farther apart than the corresponding bottom edges 42 to accommodate the gap 17 and the heated edge portions of the tube adjacent edges 13. The angle of taper of the outer tube wall contacting surfaces 43 of the pads and their distance from weld pressure center line 21 results in the desired angle of convergence of the skelp. The trailing end face 45 of the pad is located at a position ahead of the center line 21 such as to cause upsetting to initiate about three wall thicknesses or less ahead of center line 21. This distance may be adjusted slightly to compensate for material hardness and thickness plus tube diameter. It will be seen in FIG. 3 that the pads apply pressure on the inside surface of the skelp substantially along a diameter that is perpendicular to a diameter through the gap 17. The opening on top between the pads accommodates the flash as indicated in FIG. 1. Preferably a jet of suitable cooling and oxide inhibiting gas (such as a mixture of hydrogen, argon, and nitrogen) is fed through tube 49 ahead of point 47, where flash or upset begins, to remove water, oil, and other contaminating materials.

As an example to illustrate preferred relationships it will be assumed that it is desired to follow the invention in the manufacture of 2 inch O.D. 409 stainless steel tubing having a 0.045 inch wall thickness. The spreader 31 defines a convergence angle of about 5° and is positioned so that the apex of the V-gap 17 (or point of initial convergence) is about 0.180 to 0.250 inch ahead of line 21. The contacts 9 are positioned so that heating of the edges to welding temperature starts at about 1.00 to 1.250 inch ahead of line 21. The start of upset or flash (point 47) is about 0.090 to 0.125 inch ahead of line 21. To obtain the relationships mentioned, the spreader 31 as described has its rear face 45 in the vicinity of 1.50 to 2.00 inch ahead of line 21.

The invention improves the conventional tube welding process by providing a means and method to control interface welding pressure and thereby permit various metals, such as stainless steel, to be produced in a practical manner by high frequency seam welding techniques. An indication of the level of weld quality improvement realized through the subject invention would be the amount of diameter expansion a tube will withstand without failure. Previous to this invention, one could expect numerous localized and elongated failures in a weld on A.I.S.I. 409 tubing with from 5 to 15% expansion of the tube diameter. Using the techniques of the invention, tubing has been produced which showed no failures in the weld with expansion of up to 37.7% on the radius of the tube. Modifications or variations of the specific features shown or described may be made without departing from the spirit and scope of the invention.

I claim:

1. A method of continuously welding together to form a seam the abutting edges of metal which comprises continuously moving the metal longitudinally in one direction, heating the edges to be welded together, passing the heated edges through squeeze roll means to apply welding pressure to the edges, and separating the edges in advance of the weld line defined by the squeeze roll means to maintain them out of pressure contact with each other until they reach a point approximately 1 to 3 metal thicknesses in advance of said weld line.

2. A method of making metal tubing which comprises continuously passing a skelp having heated edges separated by a gap through welding pressure roll means to fuse the edges together while maintaining the edges out of pressure contact until they reach a point approximately 1 to 3 metal thicknesses in advance of the line of maximum pressure applied by the roll means.

3. The method of making stainless steel tubing or the like which comprises forming a skelp having a longitudinally extending gap between opposite edges, heating said edges to welding temperature by application of high frequency electrical current along a length extending in advance of a weld line, and applying pressure to said edges to fuse them together in a welded joint while separating said edges in advance of said weld line so that pressure is applied to them for a length of no more than approximately three metal thicknesses in advance of said weld line.

4. In a tube mill for making tubing by forming a skelp from strip metal and welding the edges of the skelp together, the combination of means for continuously moving the skelp along a path extending longitudinally of the length of the tubing being formed, high frequency electrical means for heating the edges of the skelp to be welded together, pressure rollers positioned on opposite sides of said path to apply welding pressure along a weld line to skelp entering the rollers, and spreader means fixedly positioned inside of the skelp and effective on the skelp to maintain separation of the edges to be welded until such edges have advanced to no more than approximately three times metal thickness from said weld line.

5. A tube mill as set forth in claim 4 wherein said spreader means comprises a member substantially coaxial with the skelp and having a surface engaging the inner wall thereof.

6. A tube mill as set forth in claim 5 wherein said member surace is tapered.

7. A tube mill as set forth in claim 6 wherein said member surface comprises a pair of non-magnetic pads.

8. A tube mill as set forth in claim 7 wherein the effective outer diameter of said pads is slightly greater than the normal inner diameter of the skelp in the absence of said pads.

9. A tube mill as set forth in claim 4 wherein said spreader means comprises a bar located along the axis of the skelp, support means for the bar, and non-magnetic pads on the bar engaging the inner wall of the skelp.

10. In a tube mill for making tubing by forming a skelp from strip metal and welding the edges of the skelp together, the combination of means for continuously moving the skelp along a path extending longitudinally of the length of the tubing being formed, means for heating the edges of the skelp to be fused at a high temperature gradient for rendering a shallow depth of said edges in a fusible state, pressure applying means positioned on opposite sides of said path to apply welding pressure along a weld line to the skelp entering said pressure applying means, and spreader means for controlling the angle and point of contact of said edges, said spreader means being fixedly positioned adjacent the skelp and a predetermined position remote from the point of contact of the edges and effectively contacting opposite sides of the interior surface of the skelp along a line substantially parallel to the width of the gap separating the edges to maintain separation of the edges to be welded until such edges have advanced to a predetermined distance ahead of but close to said weld line.

11. In a tube mill for making tubing by forming a skelp from strip metal and welding the edges of the skelp together, the combination of means for continuously moving the skelp along a path extending longitudinally of the length of the tubing being formed, high frequency electrical means for heating the edges of the skelp to be welded together, pressure applying means positioned on opposite sides of said path to apply welding pressure along a weld line to skelp entering said pressure applying means, and spreader means fixedly positioned inside of the skelp and effectively contacting the interior surface of the skelp to maintain separation of the edges to be welded until such edges have advanced to a predetermined distance ahead of but close to said weld line, said spreader means comprising a member substantially coaxial with the skelp and a pair of nonmagnetic pads supported on the member in surface contact with the inside of said skelp to apply pressure thereto to maintain separation of the edges substantially along a diameter of the skelp that is normal to a diameter intersecting the space between said edges.

12. A tube mill as set forth in claim 11 wherein said spreader means is shaped to provide an angle of convergence of at least 4° and said predetermined distance is substantially three times the metal thickness or less from said weld line.

13. A tube mill as set forth in claim 12 wherein said electrical means applies weld heat to said edges over a distance of substantially 1.00 inch to 1.25 inch ahead of said weld line.

14. The method of making tubing from A.I.S.I. 409 stainless steel comprising forming a skelp having a longitudinally extending V-shaped gap between the opposite edges to be welded together to form a seam, heating said edges to welding temperature along a length extending in advance of a weld line by applying high frequency electrical current to said edges, applying welding pressure to said edges to weld them together into a welded seam, said pressure being a maximum along said weld line, applying welding pressure sufficient in magnitude to produce reduction in circumference of 0.045 to 0.085 inch in said A.I.S.I. 409 tubing of 2 inch outer diameter and 0.040 to 0.060 inch wall thickness, and applying internal spreading pressure to the inner surface of said skelp to maintain a substantially predetermined angle for said V-shaped gap and to maintain said opposite edges out of contact until a predetermined point ahead of said weld line.

15. The method of making tubing from A.I.S.I. 409 stainless steel comprising forming a skelp having a longitudinally extending V-shaped gap between the opposite edges to be welded together to form a seam, heating said edges to welding temperature along a length extending in advance of a weld line by applying high frequency electrical current to said edges, applying welding pressure to said edges to weld them together into a welded seam, said pressure being a maximum along said weld line, and applying internal spreading pressure to the inner surface of said skelp to maintain a substantially predetermined angle for said V-shaped gap and to maintain said opposite edges out of contact until a predetermined point ahead of said weld line, the length of edges heated to welding temperature being substantially within the range of 1.00 to 1.25 inch 16. The method of making tubing comprising forming a skelp having a longitudinally extending V-shaped gap between the opposite edges to be welded together to form a seam, heating said edges to welding temperature along a length extending in advance of a weld line by applying high frequency electrical current to said edges, applying welding pressure to said edges to weld them together into a welded seam, said pressure being a maximum along said weld line, and applying internal spreading pressure to the inner surface of said skelp to maintain a substantially predetermined angle of no less than 4° for said V-shaped gap and to maintain said opposite edges out of contact until a predetermined point ahead of said weld line.

17. The method of making alloy steel tubing comprising forming a skelp having a longitudinally extending V-shaped gap between the opposite edges to be welded together to form a seam, heating said edges to welding temperature along a length extending in advance of a weld line by applying high frequency electrical current to said edges, applying welding pressure to said edges to weld them together into a welded seam, said pressure being a maximum along said weld line, and applying internal spreading pressure to the inner surface of said skelp to maintain a substantially predetermined angle for said V-shaped gap and to maintain said opposite edges out of contact until a predetermined point ahead of said weld line, said predetermined point being no more than three times the metal thickness.

18. A method as set forth in claim 17 wherein said predetermined angle is no less than 4°.

19. A method as set forth in claim 18 wherein the welding pressure is in the order of magnitude of that required to produce a reduction in circumference of 0.045 to 0.085 inch in A.I.S.I. 409 tubing of 2 inch outer diameter and 0.040 to 0.060 inch wall thickness.

20. A method as set forth in claim 18 wherein said length of edges heated to welding temperature is substantially within the range of 1.00 to 1.25 inch.

21. In a tube mill for making tubing by forming a skelp from strip metal and welding the edges of the skelp together, the combination of means for continuously moving the skelp along a path extending longitudinally of the length of the tubing being formed, high frequency electrical means for heating the edges of the skelp to be welded together, pressure applying means positioned on opposite sides of said path to apply welding pressure along a weld line to skelp entering said pressure applying means, and spreader means fixedly positioned inside of the skelp and effectively contacting opposite sides of a wide portion of the interior surface of the skelp spaced a substantial distance from said edges to maintain separation of the edges to be welded until such edges have advanced to a predetermined distance ahead of but close to said weld line, said spreader means comprising a member substantially coaxial with the skelp and a pair of non-magnetic pads supported on the member in surface contact with the inside of said skelp to apply pressure thereto to maintain separation of the edges substantially along a diameter of the skelp that is normal to a diameter intersecting the space between said edges.

22. A tube mill as set forth in claim 21 wherein said spreader means is shaped to maintain a predetermined angle of convergence between the opposite edges of the skelp.

23. A tube mill as set forth in claim 22 wherein said angle of convergence is at least 4°.

24. The method of making alloy steel tubing comprising forming a skelp having a longitudinally extending V-shaped gap between the opposite edges to be welded together to form a seam, heating a shallow depth only of said edges at a high temperature gradient to welding temperature along a length extending for a short length in advance of a weld line by applying high frequency electrical current to said edges, applying welding pressure to said edges to weld them together into a welded seam, said pressure being a maximum along said weld line, and applying internal spreading pressure to a wide portion of the inner surface of said skelp along a transverse line spaced a substantial distance inwardly from said edges and substantially parallel to the width of the gap to maintain a substantially predetermined angle of convergence for said V-shaped gap and to maintain said opposite edges out of contact until a predetermined point ahead of said weld line.

25. In a tube mill for making tubing by forming a skelp from strip metal and welding the edges of the skelp together, the combination of means for continuously moving the skelp along a path extending longitudinally of the length of the tubing being formed, means for heating the edges of the skelp to be fused at a high temperature gradient for rendering a shallow depth of said edges in a fusible state, pressure applying means positioned on opposite sides of said path to apply welding pressure along a weld line to the skelp entering said pressure applying means, and separator means for controlling the angle and point of contact of said edges, said separator means being fixedly positioned adjacent the skelp and a predetermined position remote from the point of contact of the edges and effective to apply outward spreading pressure on the interior surface of the skelp substantially along a transverse line spaced a substantial distance inwardly from said edges and substantially parallel to the width of the space between the edges to maintain separation of the edges to be welded until such edges have advanced to a preestablished distance ahead of but close to said weld line.

26. In a tube mill for making tubing by forming a skelp from strip metal and welding the edges of the skelp together, the combination of means for continuously moving the skelp along a path extending longitudinally of the length of the tubing being formed, high frequency electrical means for heating at a high temperature gradient only a shallow depth of the edges of the skelp to be welded together, pressure applying means positioned on opposite sides of said path to apply welding pressure along a weld line to skelp entering said pressure applying means, and tapered separator means mounted inside the skelp and providing a spreader surface operating against the interior surface of the skelp and effective to apply outward spreading pressure to the skelp to maintain separation of the edges to be welded until such edges have advanced along said path to a position close to said weld line, said spreader surface being tapered on an effective predetermined angle and providing means to maintain an angle of convergence between said edges of said predetermined angle.

27. The method of making alloy steel tubing comprising forming a skelp having a longitudinally extending V-shaped gap between the opposite edges to be welded together to form a seam, heating a shallow depth of said edges at a high temperature gradient to welding temperature along a short length extending in advance of a weld line by applying high frequency electrical current to said edges, applying very high welding pressure to said heated edges to break through barrier layers of oxides and to weld them together into a welded seam, said pressure being a maximum along said weld line, applying a jet of oxide inhibiting gas to said gap at a point spaced ahead of said weld line, and applying internal spreading pressure to a wide portion of the inner surface of said skelp along a transverse line spaced a substantial distance inwardly from said edges and substantially parallel to the width of the gap to maintain a substantially predetermined angle of convergence for said V-shaped gap and to maintain said opposite edges out of contact until a predetermined point close to and ahead of said weld line.

28. The method of making metal tubing comprising forming a skelp having a longitudinally extending V-shaped gap between the opposite edges to be welded together to form a seam, heating said opposite edges to welding temperature by application thereto of high frequency electrical current along a length in advance of a weld line, applying welding pressure which is substantially at a maximum along said weld line to said edges to weld them together into a welded seam, and separating said edges in advance of said weld line to maintain said opposite edges out of contact until they reach a point approximately 1 to 3 metal thicknesses in advance of said weld line.

29. The method of making metal tubing comprising forming a skelp having a longitudinally extending V-shaped gap between the opposite edges to be welded together to form a seam, heating said opposite edges to welding temperature by application thereto of high frequency electrical current along a length in advance of a weld line, applying welding pressure which is substantially at a maximum along said weld line to said edges to weld them together into a welded seam, and separating said edges in advance of said weld line to maintain said opposite edges out of contact until they reach a point approximately 1 to 3 metal thicknesses in advance of said weld line and to maintain an angle of no less than 4° for said V-shaped gap.

30. In a tube mill for making tubing by forming a skelp from strip metal and welding the edges of the skelp together, the combination of means for continuously moving the skelp along a path extending longitudinally of the length of the tubing being formed, high frequency electrical means for heating the edges of the skelp to be welded together, pressure means positioned on opposite sides of said path to apply welding pressure along a weld line to skelp entering the pressure means, and edge separation means positioned in advance of said weld line and effective on the skelp to maintain separation of the edges to be welded so that they are out of contact until such edges have advanced to a point no more than approximately three times the metal thickness in advance of said weld line.

31. In a tube mill for making tubing by forming a skelp from strip metal and welding the edges of the skelp together, the combination of means for continuously moving the skelp along a path extending longitudinally of the length of the tubing being formed, high frequency electrical means for heating the edges of the skelp to be welded together, pressure means positioned on opposite sides of said path to apply welding pressure along a weld line to skelp entering the pressure means, and edge separation means positioned in advance of said weld line and effective on the skelp to maintain separation of the edges to be welded so that they are out of contact until such edges have advanced to a point no more than approximately three times the metal thickness in advance of said weld line and to maintain an angle of convergence of at least 4° between said edges to be welded.

32. In a tube mill for making tubing by forming a skelp from strip metal and welding the edges of the skelp together, the combination of means for continuously moving the skelp along a path extending longitudinally of the length of the tubing being formed, high frequency electrical means for heating the edges of the skelp to be welded together, pressure applying means positioned on opposite sides of said path to apply welding pressure along a weld line to skelp entering said pressure applying means, and separator means fixedly positioned inside of the skelp and effective to apply outward spreading pressure on the interior surface of the skelp substantially along a transverse line spaced a substantial distance inwardly from said edges and substantially parallel to the width of the space between the edges to maintain separation of the edges to be welded until such edges have advanced to a preestablished distance ahead of but close to said weld line, said separator means being tapered on an effective angle of about 5° and providing means acting on the interior surface of the skelp to maintain an angle of convergence of about 5° between said edges.

33. In a tube mill for making tubing by forming a skelp from strip metal and welding the edges of the skelp together, the combination of means for continuously moving the skelp along a path extending longitudinally of the length of the tubing being formed, high frequency electrical means for heating the edges of the skelp to be welded together, pressure applying means positioned on opposite sides of said path to apply welding pressure along a weld line to skelp entering said pressure applying means, and tapered separator means mounted inside the skelp and providing a spreader surface operating against the interior surface of the skelp and effective to apply outward spreading pressure to the skelp to maintain separation of the edges to be welded until such edges have advanced along said path to a position close to said weld line, said spreader surface being tapered on an effective predetermined angle of approximately 5° and providing means to maintain an angle of convergence between said edges of said predetermined angle.

* * * * *